(12) United States Patent
Youngner et al.

(10) Patent No.: US 7,767,968 B2
(45) Date of Patent: Aug. 3, 2010

(54) CORRELATED GHOST IMAGER

(75) Inventors: Daniel W. Youngner, Maple Grove, MN (US); Lisa M. Lust, Plymouth, MN (US); Robert W. Boyd, Rochester, NY (US)

(73) Assignee: Honeywell International Inc., Morristown, NJ (US)

( * ) Notice: Subject to any disclaimer, the term of this patent is extended or adjusted under 35 U.S.C. 154(b) by 220 days.

(21) Appl. No.: 11/901,508

(22) Filed: Sep. 18, 2007

(65) Prior Publication Data

US 2009/0072146 A1 Mar. 19, 2009

(51) Int. Cl.
G01J 5/02 (2006.01)
(52) U.S. Cl. .............................. 250/339.06; 250/341.1
(58) Field of Classification Search ............ 250/339.06, 250/341.8, 341.1, 493.1, 503.1, 504 R
See application file for complete search history.

(56) References Cited

U.S. PATENT DOCUMENTS

| 6,957,099 | B1* | 10/2005 | Arnone et al. | 600/473 |
|---|---|---|---|---|
| 2004/0263379 | A1 | 12/2004 | Keller | |
| 2005/0253071 | A1* | 11/2005 | Ferguson et al. | 250/341.1 |
| 2006/0022140 | A1 | 2/2006 | Connelly et al. | |
| 2008/0017813 | A1* | 1/2008 | Vetrovec et al. | 250/504 R |
| 2008/0156991 | A1* | 7/2008 | Hu et al. | 250/341.1 |
| 2008/0179519 | A1* | 7/2008 | Andonian et al. | 250/331 |
| 2009/0074016 | A1* | 3/2009 | Mamer et al. | 372/22 |

FOREIGN PATENT DOCUMENTS

| WO | WO 2005/086620 A2 | 9/2005 |
|---|---|---|
| WO | WO 2006/021799 A1 | 3/2006 |

OTHER PUBLICATIONS

Appleby, R. et al., "Millimeter-Wave and Submillimeter-Wave Imaging for Security and Surveillance," *Proceedings of the IEEE* (2007) 95(8):1683-1690.
Korneev, D. O. et al., "Passive Millimeter Wave Imaging system with White Noise Illumination for Concealed Weapons Detection," *Imaging and Imaging Applications* (2004), 2004 Joint 29th Int. Conf. on Infrared and Millimeter Waves and 12th Int. Conf. on Terahertz Electronics, pp. 741-742.
EP Search Report for EP Application 08164514.5 dated Feb. 3, 2010.

* cited by examiner

*Primary Examiner*—David P Porta
*Assistant Examiner*—Faye Boosalis
(74) *Attorney, Agent, or Firm*—Kermit D. Lopez; Luis M. Ortiz; Kris T. Fredrick

(57) ABSTRACT

A method and system for detecting concealed weapons and explosives by imaging THz scenes using conventional optics and detectors is provided. Photon fields with two different wavelengths can be sent through a chopper and towards a wavelength-selective mirror. A light beam with a wavelength in the visible or IR range is sent toward a visible photon array detector. Similarly, light beams with wavelengths in the THz range can be sent towards a target, which are reflected and/or absorbed by objects in the target. The reflected or transmitted light continues on through an optional filter to remove background light, then into a non-imaging detector. The visible photon array detector can be coupled with the non-imaging detector, which will register an image of the scene that is illuminated by the THz photons.

20 Claims, 5 Drawing Sheets

CORRELATED GHOST IMAGER

TECHNICAL FIELD

Embodiments are generally related to imaging in the THz (terahertz) frequency range. Embodiments are also related to methods and systems for imaging THz scenes of potential concealed weapon carriers utilizing conventional optics and detectors.

BACKGROUND OF THE INVENTION

The detection of weapons concealed underneath a person's clothing is an important obstacle to the improvement of the security of the general public as well as the safety of public assets like airports and buildings. Manual screening procedures for detecting concealed weapons such as handguns, knives, and explosives are common in controlled access settings like airports, entrances to sensitive buildings, and public events. It is desirable sometimes to be able to detect concealed weapons from a standoff distance, especially when it is impossible to arrange the flow of people through a controlled procedure.

One prior art approach utilizes a magnetometer to detect certain metallic objects. Unfortunately, this approach does not detect most organic polymer and composite materials that may be used to fabricate firearms, explosives, and other objects, which are frequently the subject of security inspections. In another approach, millimeter wave electromagnetic radiation is applied to provide images that can reveal objects concealed by clothing. This approach typically depends on the ability of a human inspector to visually detect one or more suspect objects from the resulting image. Accordingly, there are intrinsic speed limitations in these approaches, and such approaches are subject to variation with the ability of different inspectors.

Terahertz imaging is becoming more viable for many applications due to advances in detector and emitter technologies. One of the applications for THz imaging is the detection and identification of concealed weapons (e.g., in airport security screening lines). THz radiation can detect concealed weapons since many non-metallic, non-polar materials are transparent to THz radiation, which poses no health risk for scanning of people. The target compounds such as explosives and illicit drugs have characteristic THz spectra that can be used to identify these compounds. Using THz radiation it is therefore possible to in principle detect explosives and biological weapons even if they are concealed in clothing, sealed packages, suitcases, etc since the THz radiation is readily transmitted through plastics, clothing, luggage, paper products, walls, and other non-conductive (non-metallic) materials.

Most THz imaging systems proposed in the past have been based upon a single THz source and detector pair that are scanned across the object space to be imaged. These systems consequently take a significant amount of time (typically minutes) to acquire the data to generate a THz image of even a single small object (e.g. of approximately a few square centimeters), and are not suitable to real-time acquisition of THz images. Another prior art approach utilizes a single THz array detector that detects the THz energy that passes through or reflects from the object, and reaches its collecting area over time. This imaging system requires a large area having good spatial details (resolution) in order to obtain an image of a large array of detectors. Similarly, to obtain good spatial resolution with conventional THz systems, the THz beam must have a small beam size, which reduces the area that can be imaged.

Based on the foregoing difficulties, it is apparent that there is a need for improved systems and methods for imaging of terahertz scenes using conventional optics and detectors to detect concealed weapons and explosives. It is also desirable to form THz images without a THz arrayed detector, which enables images to be orders of sharper magnitude.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for improved methods and systems for detecting concealed weapon.

It is another aspect of the present invention to provide for improved methods and system for imaging THz (terahertz) scenes of potential concealed weapon carriers utilizing conventional optics and detectors.

The aforementioned aspects and other objectives and advantages can now be achieved as described herein. A method and system for detecting concealed weapons and explosives by imaging THz scenes using conventional optics and detectors is provided. Photon fields with two different wavelengths can be sent through a chopper and towards a wavelength-selective mirror. A beam with a wavelength in the visible or IR range is sent toward a visible photon array detector. Similarly, light beams with wavelengths in the THz range can be sent towards a target, which are reflected and/or absorbed by objects in the target. The reflected or transmitted light continues on through an optional filter to remove background light, then into a non-imaging detector. The visible photon array detector is "turned on" only when a signal reaches the non-imaging detector. The visible photon array detector can be coupled with the non-imaging detector, which will register an image of the scene that is illuminated by the THz photons.

The visible photon array detector pixels are much smaller than the wavelength of a THz photon, which enables the images to be orders of sharper magnitude. An up-conversion crystal can be placed in the detector path for detecting THz images with the visible photon array detector. Similarly, a down-conversion crystal can be used to generate the photon fields with two different wavelengths. The down-conversion crystal and a pump-laser can be placed on a gimbaled platform in order to enable raster scanning of the THz beam at the target. The photon fields with a first wavelength can be in the visible or IR (infrared) range and the other is in the THz range. Such method and system can be used for imaging concealed weapons through clothing, and imaging chemicals that have unique spectral fingerprints in the THz spectral bands (e.g. explosives) and is completely safe to use.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
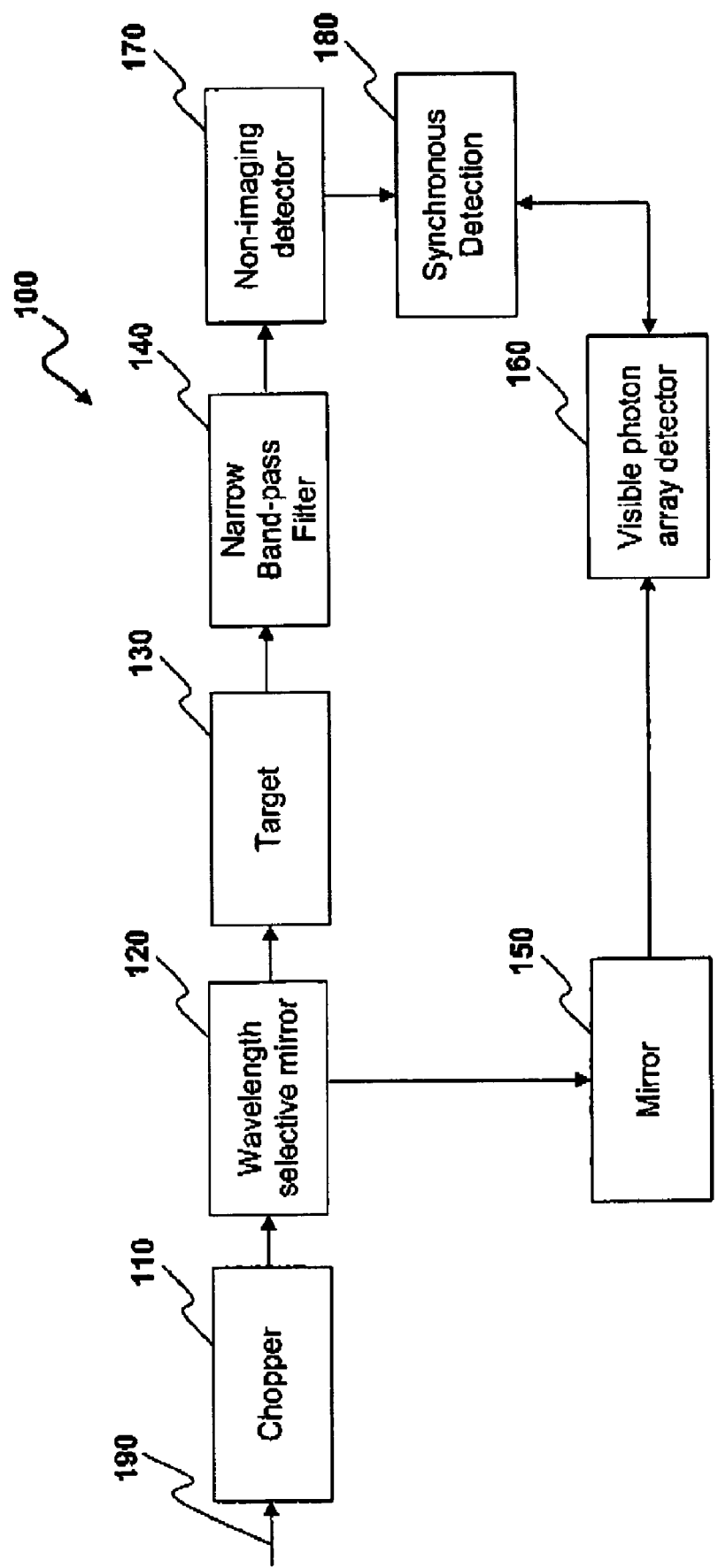
FIG. 1 illustrates a block diagram of a correlated ghost imaging system for detecting concealed weapons and explosives, which can be adapted for use in implementing a preferred embodiment.

Referring to FIG. 1 a block diagram of a correlated ghost imaging system 100 for detecting concealed weapons and explosives is illustrated, which can be adapted for use in implementing a preferred embodiment. Note that the method and system described herein relies on the use of a THZ imaging, which can be employed for imaging concealed weapons through clothing and imaging explosives. As shown in FIG. 1, system 100 can include a chopper 110, a wavelength selective mirror 120, a target 130, a non-imaging detector 170 and a visible photon array detector 160. Arrow 190 indicates the flow of photon fields with two different wavelengths to the chopper 110 and then to the wavelength selective mirror 120 for alternately transmitting and reflecting the photon fields 190.

The photon field 190 with one wavelength is sent towards a visible photon array detector 160, which can be facilitated through a second mirror 150 or other known optics. The other light beam continues on through the wavelength selective mirror 120 towards a target 130, which reflects off of objects in the target 130, and/or is absorbed by objects in the target 130. The reflected or transmitted light continues on through an optional filter 140 to remove background light, then into a non-imaging detector 170. The non-imaging detector 170 will generate an output signal having an amplitude that is proportional to the angle that an illuminating source is displaced from one plane normal to the surface of the detector 170. The detector 170 is insensitive to illumination bursts or variations and will continue to provide accurate and non-varying angles indicating output signals. The visible photon array detector 160 is "turned on" only when a signal reaches the non-imaging detector 170 by employing synchronous detection 180, which will register an image of the target 130.

Figure 2:
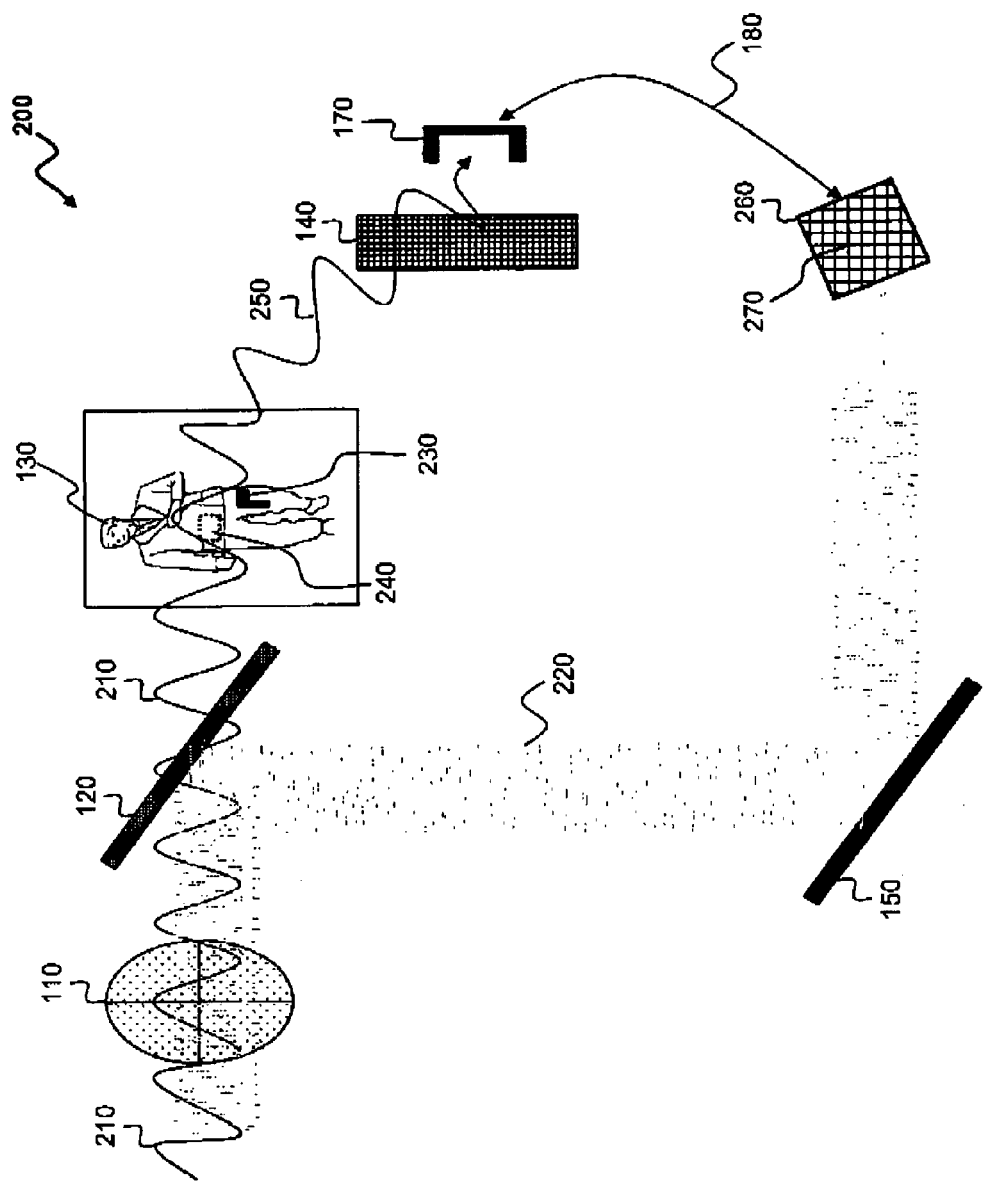
FIG. 2 illustrates a system diagram of a correlated ghost imager for detecting concealed weapons and explosives, in accordance with a preferred embodiment.

Referring to FIG. 2 a system diagram of a correlated ghost imager for detecting concealed weapons and explosives 200 is illustrated, in accordance with a preferred embodiment. Note that in FIGS. 1-5, identical or similar parts or elements are generally indicated by identical reference numerals. Photon fields 190, e.g., collimated light beams with two different wavelengths, are sent through the chopper 110 and towards the wavelength-selective, or half-silvered mirror 120. The chopper 110 can be a mechanical device or an electro-optic device such as $LiNbO_3$, or any other technology capable of modulating the photon fields. One of the light beams, e.g., a Terahertz beam 210 as shown in FIG. 2, continues on through the wavelength selective mirror 120 toward the target 130. The other light beam, e.g., a visible light beam 220 as shown in FIG. 2, is sent toward the visible photon array detector 150.

A mirror 150 and/or refractive elements (not shown) can be placed along the path towards the visible photon array detector 150. The visible photon array detector 150 comprises an array of sensor cells capable of sensing radiation. The cells are connected in a manner to form distinguishable bitmap images through a pattern of correspondence among the cells. Each bitmap image formed comprises a combination of one or more cells indicative of detecting an image pixel within a field of array cells that have been non-indicative of such detection. The pattern of correspondence may be one of inhibition of the operation of other cells in the array or one of indication of operation to other cells in the array.

The visible photon array detector 150 can be a conventional CCD (Charge-coupled device) array 260 as exist in, for example, commercially available video cameras. The optics can be are controlled such that each burst of visible light beam 220 that leaves the chopper 110 heads toward a single pixel 270 in the CCD array 260. Different pixels 270 in the CCD array 260 can be illuminated either by re-directing the visible light beam 220 before it reaches the wavelength selective mirror 120, or by simultaneously redirecting both light beams 210 and 220 in a correlated fashion after they leave the wavelength selective mirror 120.

The THz beam 210 that continues on toward the target 130 reflects off of objects such as a gun 230 and/or an explosive 240 as shown in the target 130. The reflected or transmitted light 250 continues on through an optional filter 140, e.g., a narrow band-pass filter to remove background light, then into a non-imaging detector 170, e.g., a bucket detector. The CCD array 260 is coupled with the bucket detector 170 by employing synchronous detection 180 which will register an image of the target 130 that is illuminated by the THz photons 210.

Figure 3:
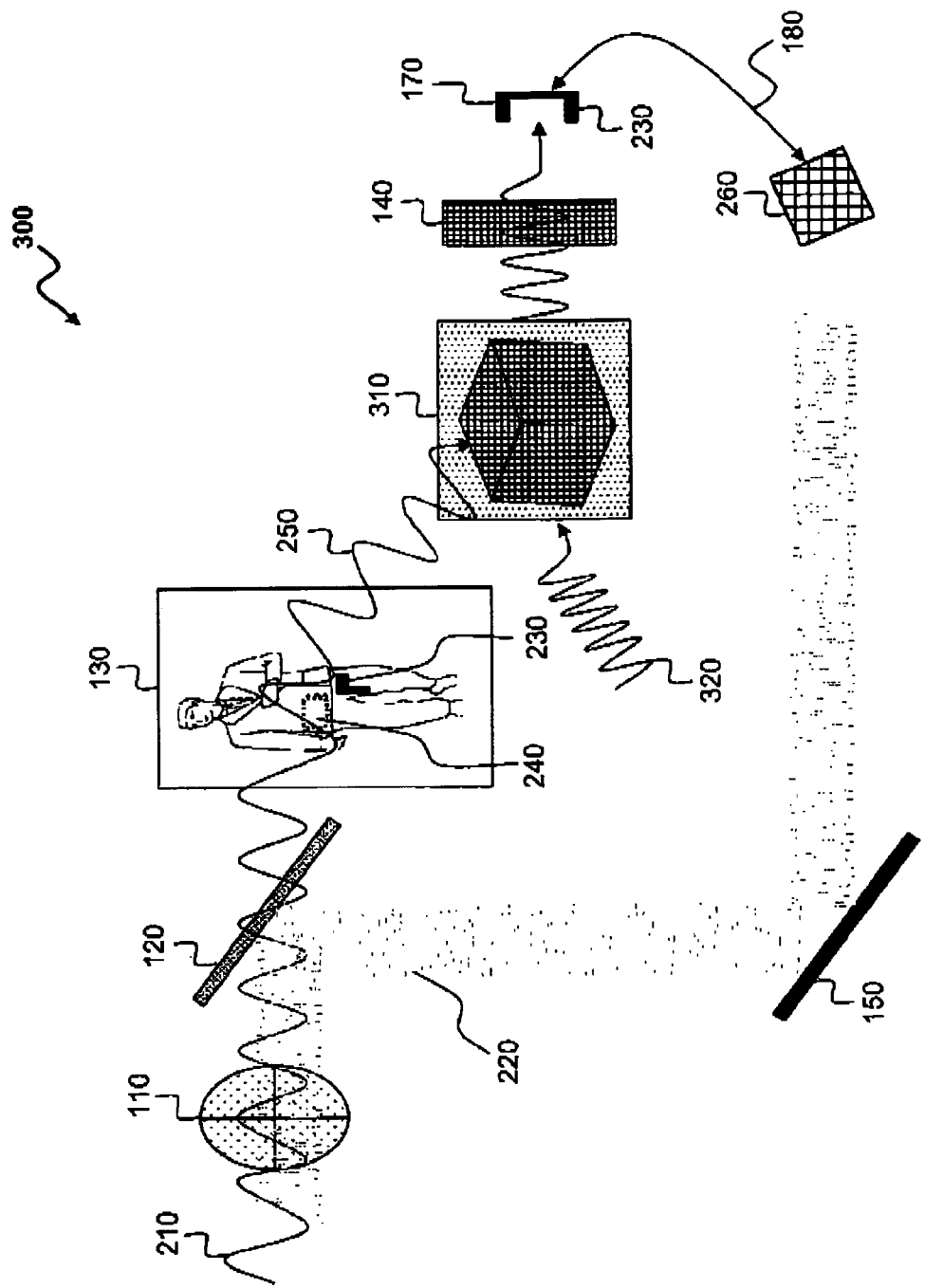
FIG. 3 illustrates a system diagram of a correlated ghost imager utilizing an up-conversion crystal in the detector path, which can be implemented in accordance with an alternative embodiment.

Referring to FIG. 3 a schematic diagram of a correlated ghost imager 300 utilizing an up-conversion crystal 310 in the detector path is illustrated, which can be implemented in accordance with an alternative embodiment. Note that in FIGS. 1-5, identical or similar parts or elements are generally indicated by identical reference numerals. The reflected or transmitted light 250 from the target 130 can be sent to an up-conversion crystal 310 along with pump photons 320 for detection of THz beam 210 with the CCD array 260.

Figure 4:
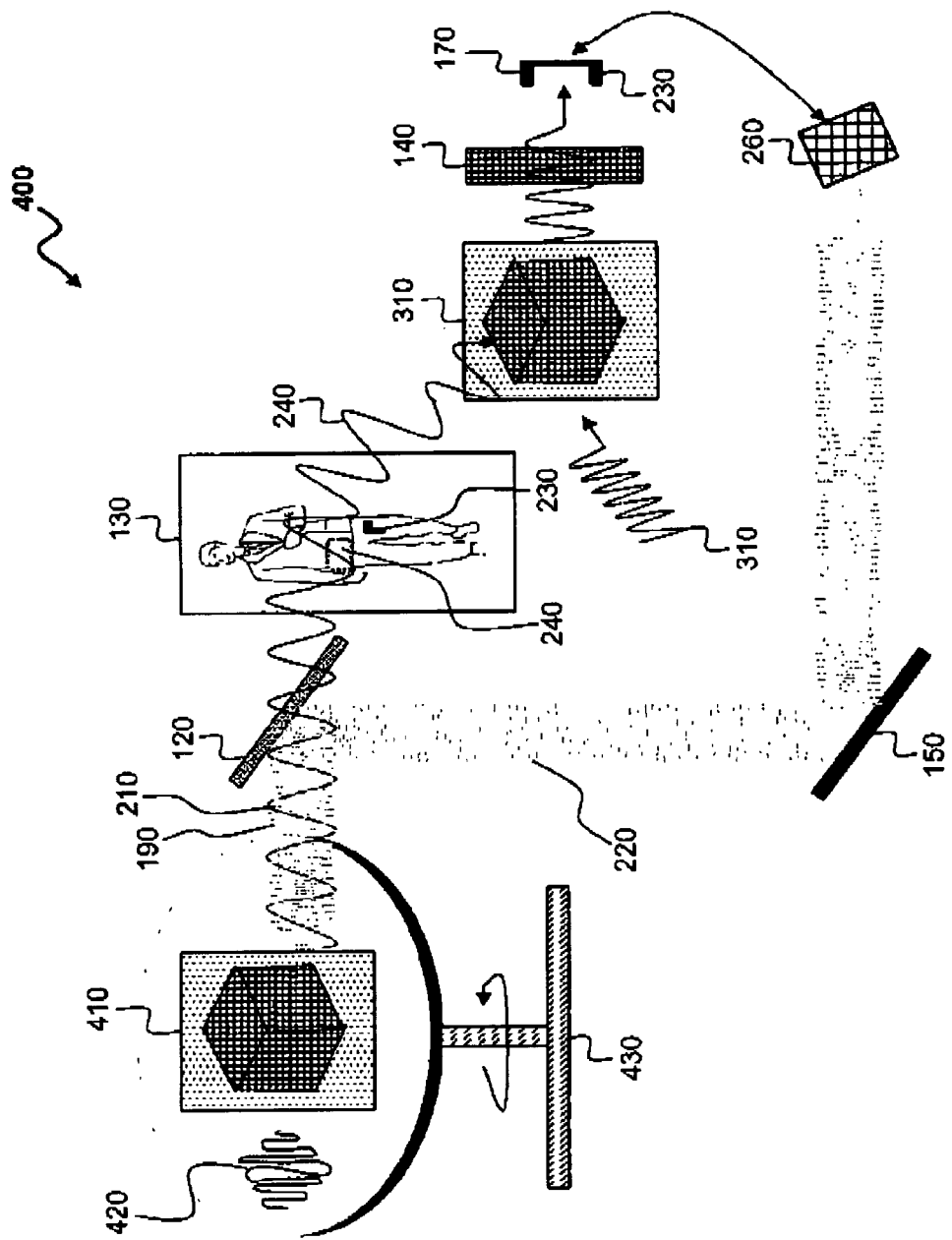
FIG. 4 illustrates a system diagram of a correlated ghost imager utilizing a down-conversion crystal in the source path, which can be implemented in accordance with an alternative embodiment.

Referring to FIG. 4 a schematic diagram of a correlated ghost imager 400 utilizing a down-conversion crystal 410 in the source path is illustrated, which can be implemented in accordance with an alternative embodiment. A down-conversion crystal 410 can be used to generate the photon fields 190 with two different wavelengths 210 and 220. The down-conversion crystal 410 and a pump-laser 420 can be placed on a gimbaled platform 430 in order to enable raster scanning of the THz beam 210 at the target 130. The photon fields 190 with first wavelength can be in the visible or IR (infrared) range and the other is in the THz range.

Figure 5:
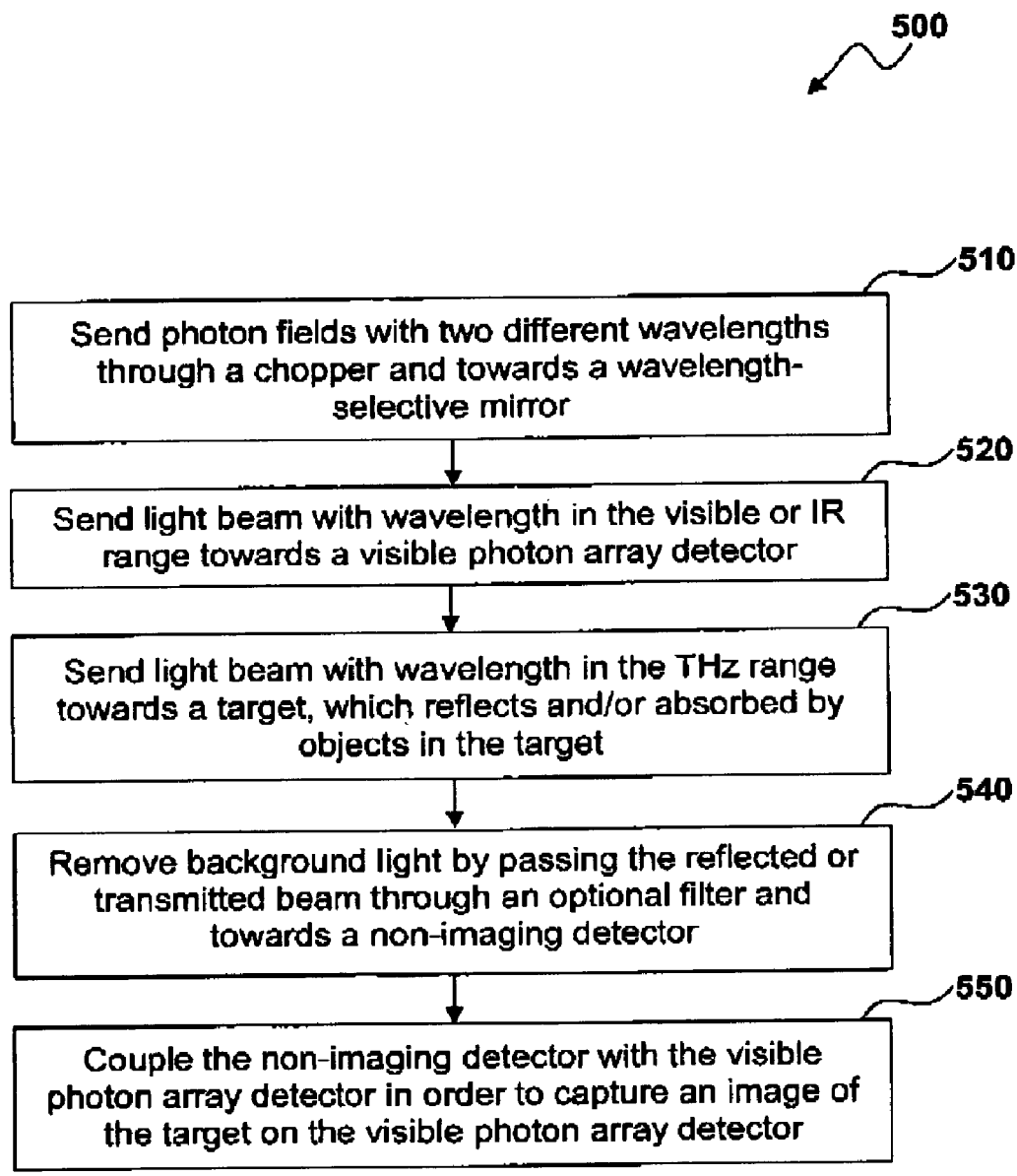
FIG. 5 illustrates a high level flow chart of operations illustrating logical operational steps of a method for detecting concealed weapons and explosives, in accordance with a preferred embodiment.

Referring to FIG. 5 a high level flow chart of operations illustrating logical operational steps of a method 500 for detecting concealed weapons and explosives is illustrated, in accordance with a preferred embodiment. Photon fields with two different wavelengths 210 and 220 can be sent through a chopper 110 and towards a wavelength-selective mirror 120 as shown in block 510. Thereafter, a resulting light beam with wavelength in the visible or IR range 220 can be sent towards a visible photon array detector 160, as depicted at block 520. Thereafter, as indicated at block 530, light beam with wavelength in the THz range 210 can be sent towards a target 130, which reflects and/or absorbed by objects 230 and 240 in the target 130. Next, as described at block 540, background light can be removed by passing the reflected or transmitted beam 250 through an optional filter 140, which is then sent to a non-imaging detector 170. The non-imaging detector 170 can be coupled with the visible photon array detector 160 in order to capture an image of the target 130 on the visible photon array detector 160, as depicted at block 550.

Based on the foregoing it can be appreciated that such method and systems can be used for imaging concealed weapons through clothing, and imaging chemicals that have unique spectral fingerprints in the THz spectral bands (e.g.

explosives) and is completely safe to use. The method of terahertz imaging described herein addresses many of the problems with traditional imaging techniques. The main advantage of this method is that it is possible to capture THz images by coupling a single non-imaging THz receiver with a visible-photon array detector. The visible photon detector pixels can be much smaller than the wavelength of a THz photon, which enables images to be orders of magnitude sharper than normal diffraction-limited optics.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for imaging THz (terahertz) scenes of potentially concealed weapon carriers, comprising:
    directing a sequence of photon fields having a visible light beam and a terahertz beam through a chopper and towards a wavelength selective mirror for alternately transmitting and reflecting said plurality of photon fields;
    transmitting said visible light beam towards an imaging array through a refractive element and transmitting said terahertz beam towards a target, which gets absorbed and/or reflected by a plurality of objects in said target, which is then sent to a non-imaging detector; and
    coupling said non-imaging detector with said imaging array in order to capture an image of said target on said imaging array.

2. The method of claim 1 wherein said imaging array comprises a CCD (charged coupled device) array.

3. The method of claim 1 wherein said non-imaging detector comprises a bucket detector.

4. The method of claim 1 wherein said visible light beam leaves said chopper and heads toward a single pixel in said CCD array.

5. The method of claim 1 wherein said CCD array comprises a plurality of pixels that are smaller than the wavelength of said THz beam in order to enable said images of said target to be orders of sharper magnitude.

6. The method of claim 1 further comprising;
    placing an up-conversion crystal in a detector path for detecting said THz beam of said images with said imaging array.

7. The method of claim 1 further comprising;
    generating said sequence of photon fields having said visible light beam and said terahertz beam utilizing a down-conversion crystal; and
    placing said down-conversion crystal and a pump-laser on a gimbaled platform in order to enable a raster scanning of said THz beam at said target.

8. The method of claim 1 wherein said sequence of photon fields comprises an IR (infrared) beam and a terahertz beam.

9. The method of claim 1 wherein said plurality of objects in said target comprises at least one concealed weapons and a plurality of imaging chemicals that have a unique spectral fingerprints in said THz beam.

10. A system for imaging THz (terahertz) scenes of potentially concealed weapon carriers, comprising:
    a chopper adapted to receive a plurality of photon fields having a visible light beam and a terahertz beam and direct the plurality of photon fields towards a wavelength selective mirror;
    a wavelength selective mirror adapted to alternately transmit and reflect the plurality of photon fields by further transmitting said visible light beam towards an imaging array through a refractive element and transmitting said terahertz beam towards a target, which gets absorbed and/or reflected by a plurality of objects associated with the target, wherein reflected portions of the terahertz beam are received by a non-imaging detector;
    a non-imaging detector adapted to receive terahertz beams; and
    a imaging array coupled to said non-imaging detector, said imaging array adapted to capture an image of said target.

11. The method of claim 10 wherein said imaging array comprises a CCD (charged coupled device) array.

12. The method of claim 10 wherein said non-imaging detector comprises a bucket detector.

13. The method of claim 10 wherein said visible light beam leaves said chopper and heads toward a single pixel in said CCD array.

14. The method of claim 10 wherein said CCD array comprises a plurality of pixels that are smaller than the wavelength of said THz beam in order to enable said images of said target to be orders of sharper magnitude.

15. The system of claim 10 further comprising;
    an up-conversion crystal placed between the detector and the wavelength selective mirror for facilitating the detection of said THz beam images by said imaging array.

16. The system of claim 10 further comprising;
    a down-conversion crystal adapted to generate said plurality of photon fields having a visible light beam and a terahertz beam.

17. The system of claim 16 wherein said down-conversion crystal is placed together with a pump-laser on a gimbaled platform, wherein said placement facilitates raster scanning of said THz beam at said target.

18. A system for imaging THz (terahertz) scenes of potentially concealed weapon carriers, comprising:
    a down-conversion crystal adapted to generate a plurality of photon fields having a visible light beam and a terahertz beam;
    a chopper adapted to receive said plurality of photon fields having a visible light beam and a terahertz beam and direct the plurality of photon fields towards a wavelength selective mirror;
    a wavelength selective mirror adapted to alternately transmit and reflect the plurality of photon fields by further transmitting said visible light beam towards an imaging array through a refractive element and transmitting said terahertz beam towards a target, which gets absorbed and/or reflected by a plurality of objects associated with the target, wherein reflected portions of the terahertz beam are received by a non-imaging detector;
    a non-imaging detector adapted to receive terahertz beams;
    an up-conversion crystal placed between the detector and the wavelength selective mirror for facilitating the detection of said THz beam images by said imaging array; and
    a imaging array coupled to said non-imaging detector, said imaging array adapted to capture an image of said target.

19. The system of claim 18 wherein said imaging array comprises a CCD (charged coupled device) array.

20. The system of claim 18 wherein said down-conversion crystal is placed together with a pump-laser on a gimbaled platform, wherein said placement facilitates raster scanning of said THz beam at said target.

* * * * *